United States Patent [19]

Heasley

[11] 4,080,280
[45] Mar. 21, 1978

[54] PIN FOR FORMING REFLECTOR

[75] Inventor: James H. Heasley, Shaker Heights, Ohio

[73] Assignee: Ferro Corporation, Cleveland, Ohio

[21] Appl. No.: 774,591

[22] Filed: Mar. 7, 1977

Related U.S. Application Data

[63] Continuation-in-part of Ser. No. 635,634, Nov. 26, 1975, and Ser. No. 652,236, Jan. 26, 1976.

[51] Int. Cl.² .................. C25D 1/10; G02B 5/124
[52] U.S. Cl. .................................. 204/281; 204/6; 350/103
[58] Field of Search .............. 204/6, 281; 350/103, 350/97, 102; 264/1; 425/808

[56] References Cited

U.S. PATENT DOCUMENTS

| | | | |
|---|---|---|---|
| 3,332,327 | 7/1967 | Heenan | 350/103 |
| 3,450,459 | 6/1969 | Haggerty | 350/103 |
| 3,684,348 | 8/1972 | Rowland | 350/103 |
| 3,758,191 | 9/1973 | Hedgewick | 350/103 |
| 3,762,825 | 10/1973 | Reusser | 404/16 |
| 3,799,646 | 3/1974 | Footchkar | 350/103 |
| 3,883,224 | 5/1975 | Tanaka | 350/103 |
| 3,926,402 | 12/1975 | Heenan | 204/281 |
| 3,954,324 | 3/1977 | Arnott et al. | 350/106 |
| 3,957,616 | 5/1976 | Montgomery | 204/281 |

Primary Examiner—T. M. Tufariello
Attorney, Agent, or Firm—Milton L. Simmons; Wesley B. Taylor

[57] ABSTRACT

A molding pin is disclosed adapted to form a light-reflecting area in a reflector having a tri-faceted forming end provided with the configuration of three adjacent facets of a rectangular parallelepiped. The three facets are mutually perpendicular to each other, and at least two of the facets are rectangular with two adjacent sides of each rectangle being unequal. In use, the pin may be combined with other like pins to form a bundle from which a reflector or reflector mold is made.

16 Claims, 22 Drawing Figures

PIN FOR FORMING REFLECTOR

CROSS-REFERENCE TO RELATED CASES

This is a continuation-in-part of an application, Ser. No. 635,634, filed Nov. 26, 1975, and an application, Ser. No. 652,236, filed Jan. 26, 1976.

BACKGROUND OF THE INVENTION

The present invention relates to a pin adapted to form a light-reflecting area in glass or plastic or still other like moldable material. Normally, such a pin is stacked with other pins in bundles, and the bundles are used to make a reflector, such as is embodied in elevated road signs, road-level markers, on moving vehicles such as a bicycle, and the like.

One popular type of reflector embodies cube corners, sometimes referred to as triple reflectors, in which the light-reflecting area comprises three square faces which are mutually perpendicular. Since the sides are square and equal in size and thus simulate a cube, such a reflecting area has come to be called a "cube corner". While a cube corner structure provides satisfactory reflectance to light striking perpendicularly against an array or strip of cube corners, that is, generally parallel to the axes of the cube corners, its performance falls off fairly rapidly as incident light strikes the array at angles away from the normal to the surface of the cube corner array.

The cited applications, Ser. No. 635,634 and Ser. No. 652,236, disclose retroreflectors which embody a novel type of light-reflecting area defined therein as a rectangular parallelepiped. The pin of the present application is designed to form the rectangular parallelepiped light-reflecting areas.

SUMMARY OF THE INVENTION

The principal object of the present invention is to provide a molding pin adapted to form a light-reflecting area in a reflector that is of the rectangular parallelepiped type. The pin terminates in a tri-faceted forming end having the configuration of three adjacent facets of a rectangular parallelepiped. The three facets are mutually perpendicular to each other, and at least two of the facets are rectangular with two adjacent sides of each rectangle being unequal.

Within the context of being mutually perpendicular and two of the facets being rectangular as described, the tri-faceted forming end of the pin can assume many angular dispositions relative to the balance of the forming pin. These various dispositions are largely determined by the angular relation desired of the central longitudinal axis of the pin with respect to the forming end or with respect to the position of a reflector to be molded about the forming end.

In practice, a pin is stacked with other like companion pins and suitably secured as a bundle, and the bundle is then used to form the reflector. The reflector can be cast by directly molding it about the forming ends of the pins of the bundle; or by initially electroforming a mold about the pins and then using the electroform mold to shape the reflector.

DESCRIPTION OF THE PREFERRED EMBODIMENTS

A pin may be fabricated from a stainless steel or other corrosion-resistant alloy, capable of taking a high polish, to form an elongated shank portion terminating in a tri-faceted forming end. The cross-section of the shank portion is not significant. However, for convenience, it usually has the same shape as a projection of the forming head. The size of the pin is not critical. As a rule, a pin may vary in width from about 50 mils to about 150 mils and in length from about 1.5 inches to about 2.5 inches.

The tri-faceted forming end of the pin is critical. It has the configuration of three adjacent facets of a rectangular parallelepiped, the three facets being mutually perpendicular to each other and at least two of the facets being rectangular with two adjacent sides of each rectangle being unequal.

If a polyhedron is a solid bounded by planes, and a prism is a polyhedron of which two faces are congruent polygons in parallel planes, and the other faces are parallelograms having two of their sides in the two parallel planes, a parallelepiped may be broadly defined as a prism whose bases are parallelograms. A right parallelepiped, then, is a parallelepiped with edges perpendicular to the bases. As used here and in the claims, the term "rectangular parallelepiped" means a right parallelepiped whose bases or sides are rectangles. However, some authorities broadly define a rectangle as a parallelogram whose four angles are right angles. This definition generically includes a square as a rectangle. At least two of the three rectangular facets of the present pin which form the rectangular parallelepiped cannot be square. Each must be rectangular under the more generally used definition that two adjacent sides or edges of a rectangle are unequal. As used here and in the claims, the term "rectangular parallelepiped" therefore more fully means a right parallelepiped whose bases or sides are rectangles of which at least two adjacent bases or sides are rectangular and each rectangle has unequal sides or edges.

The rectangular parallelepiped herein contemplated may be regarded as the volume occupied by a six-faceted box, all six facets being a right parallelepiped. In a present forming pin, only three of the facets are actually exposed and define the forming end with at least two facets being rectangular in which two adjacent sides or edges of each of the two rectangular facets are unequal. Preferably, the two rectangular facets of the pin, as defined, are equal in size or area, and the third facet is a square. The three facets of the forming end may also be considered as forming the sides of a trihedral angle with two facets being rectangular as defined. The facets of the forming end are machined, ground, lapped, polished or otherwise treated to produce highly reflective surfaces.

Figure 13:
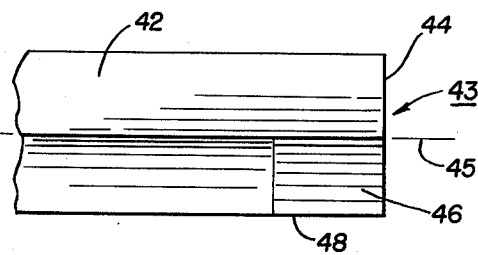
Figure 14:
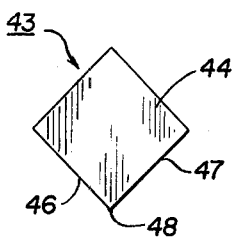
Figure 15:
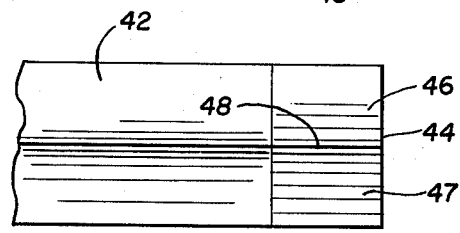

FIGS. 1 through 15 illustrate some of the forms the present pin may take. The embodiment of FIGS. 1 to 3 and the embodiment of FIGS. 13 to 15 represent two opposite extremes, while the embodiments of FIGS. 4 through 12 represent some of the possible gradations or stations in progressing from the embodiment of FIG. 1 to the embodiment of FIG. 13. The differences among the various embodiments are largely determined by the angular relation of the central longitudinal axis of the pin with respect to the forming end or with respect to a part to be molded about the forming end.

Figure 1:
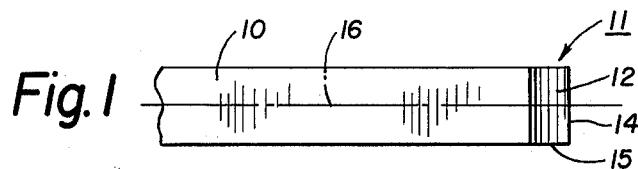
FIGS. 1, 4, 7, 10, and 13 are side elevational views of different embodiments of the present molding pin.
Figure 2:
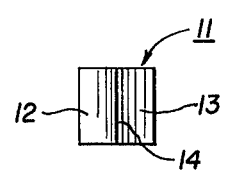
FIGS. 2, 5, 8, 11, and 14 are right hand end views of FIGS. 1, 4, 7, 10, and 13, respectively.
Figure 3:
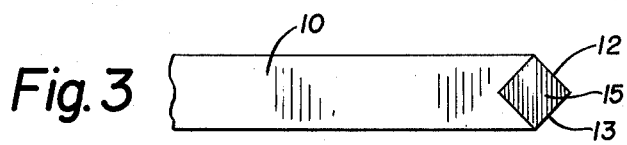
FIGS. 3, 6, 9, 12, and 15 are bottom plan views of FIGS. 1, 4, 7, 10, and 13, respectively.

Referring initially to FIGS. 1 to 3, the pin of this embodiment comprises an elongated shank portion 10 terminating in a tri-faceted forming end generally represented at 11 and having a rectangular cross-section which in this instance is a square. Facets 12 and 13 of the forming end converge to form an intersecting line 14. The third facet 15 (bottom plan view of FIG. 3) extends from facets 12 and 13 rearwardly of the pin in a direction along a side of the forming end which, in this embodiment, is coplanar with shank portion 10 of the pin. Facets 12, 13 and 15 are mutually perpendicular and define the rectangular parallelepiped in which facets 12 and 13 are rectangular as above described. The central longitudinal axis of the pin, shown by the imaginary, broken line 16, is perpendicular to the intersecting line 14.

Figure 4:
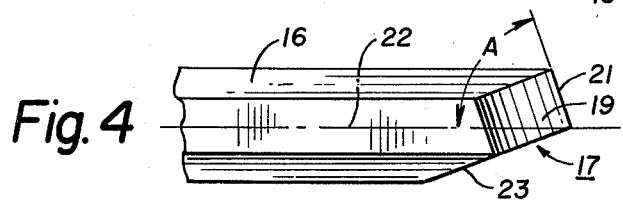
Figure 5:
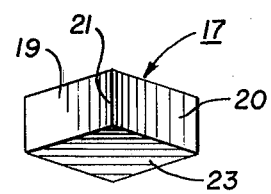
Figure 6:
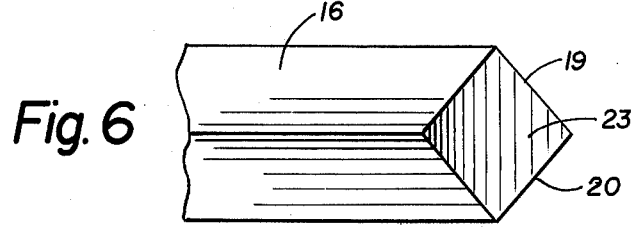

The embodiment of FIGS. 4 to 6 comprises an elongated shank portion 16 terminating in a tri-faceted forming end generally represented at 17 and having a hexagonal cross-section. Facets 19 and 20 of the forming head converge to form an intersecting line 21 subtending an acute angle A with a longitudinal central axis of the pin, shown by the imaginary, broken line 22. A third facet 23 extends from facets 19 and 20 rearwardly of the pin in a direction to intersect two of the six sides of the hexagonal cross-section (FIG. 6). Facets 19, 20 and 23 are mutually perpendicular and define the rectangular parallelepiped in which facets 19 and 20 are rectangular as above described. In this embodiment, the central longitudinal axis of the pin 22 is parallel to the body diagonal of the rectangular parallelepiped, that is, a diagonal connecting two opposite corners of the body of the parallelepiped; note diagonal 64 in FIG. 22 and its description.

Figure 7:
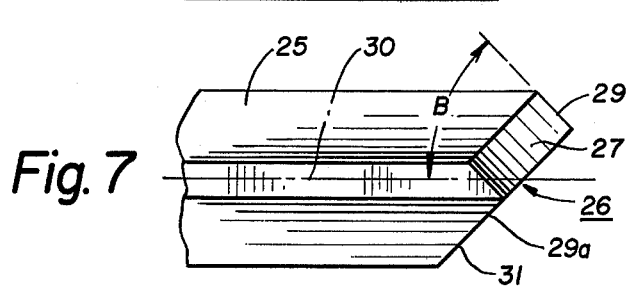
Figure 8:
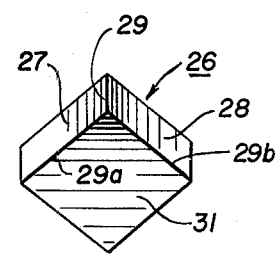
Figure 9:
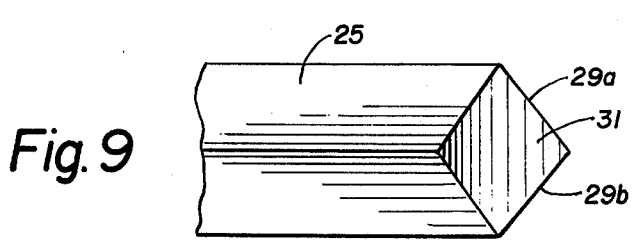

The embodiment of FIGS. 7 to 9 comprises an elongated shank portion 25 terminating in a tri-faceted forming end generally represented at 26 and having a hexagonal cross-section. Facets 27 and 28 of the forming end converge to form an intersecting line 29 subtending an acute angle B with the central longitudinal axis of the pin, shown by the imaginary, broken line 30. A third facet 31 extends from facets 27 and 28 rearwardly of the pin in a direction to intersect two of the six sides of the hexagonal cross-section (FIG. 9). Facets 27, 28 and 31 are mutually perpendicular and define the rectangular parallelepiped in which facets 27 and 28 are rectangular as above described. Facet 31 forms intersecting lines 29a and 29b with facets 27 and 28, respectively, lines 29, 29a and 29b having a common point. In this embodiment, the central longitudinal axis of the pin 30 is parallel to a line subtending equal angles with intersecting lines 29, 29a and 29b.

Figure 10:
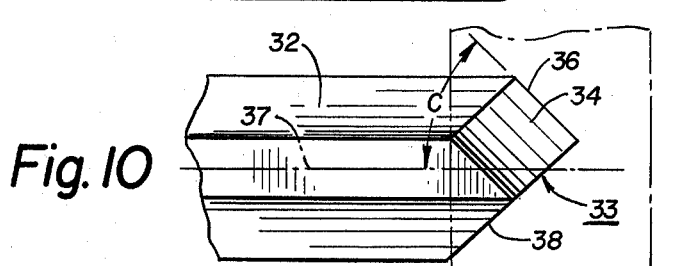
Figure 11:
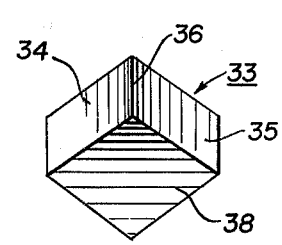
Figure 12:
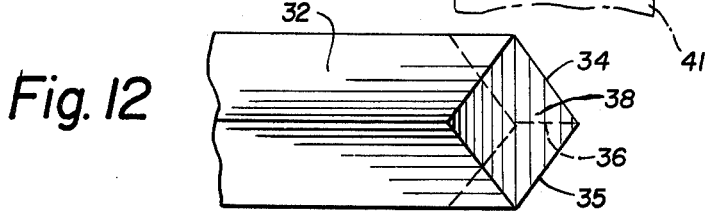

The embodiment of FIGS. 10 to 12 comprises an elongated shank portion 32 terminating in a tri-faceted forming end generally represented at 33 and having a hexagonal cross-section. Facets 34 and 35 of the forming end converge to form an intersecting line 36 subtending an acute angle C with the longitudinal axis of the pin, shown by the imaginary, broken line 37. A third facet 38 extends from facets 34 and 35 rearwardly of the pin in a direction to intersect two of the six sides of the hexagonal cross-section (FIG. 12). Facets 34, 35 and 38 are mutually perpendicular and define the rectangular parallelepiped in which facets 34 and 35 are rectangular as above described. In this embodiment, the central longitudinal axis 37 of the pin is perpendicular to the plane of a face of a reflector formed by such pin, such as the far side or refracting face 40 of a reflector that is shown in phantom at 41.

The embodiment of FIGS. 13 to 15 comprises a shank portion 42 terminating in a tri-faceted forming end generally represented at 43 and having a rectangular cross-section which in this instance is square. An end facet 44 is disposed at right angles to the central longitudinal axis of the pin, shown by the imaginary, broken line 45. The remaining two facets 46 and 47 extend from end facet 44 rearwardly of the pin in directions along two adjacent sides of the forming end, and in this embodiment are coplanar with shank portion 42 of the pin. Facets 46 and 47 converge to form an intersecting line 48 which, in the embodiment illustrated, is colinear with an edge of shank portion 42. Facets 44, 46 and 47 are mutually perpendicular and define the rectangular parallelepiped in which facets 46 and 47 are rectangular as above described. In this embodiment the longitudinal axis 45 of the pin is parallel to intersecting line 48.

Figure 16:
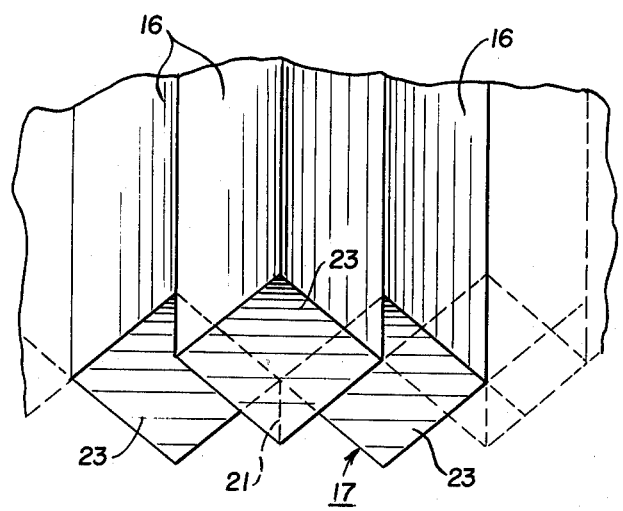
FIGS. 16 and 17 are plan and front end views, respectively, of a bundle of forming pins.
Figure 18:
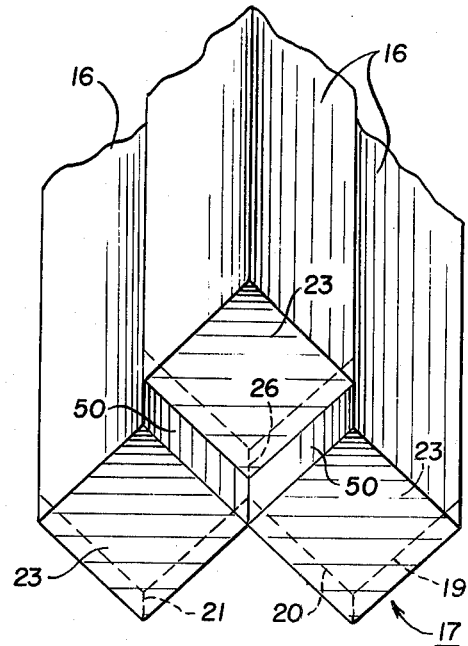
FIG. 18 is a plan view similar to FIG. 16 and illustrates a modified form of a bundle.
Figure 17:
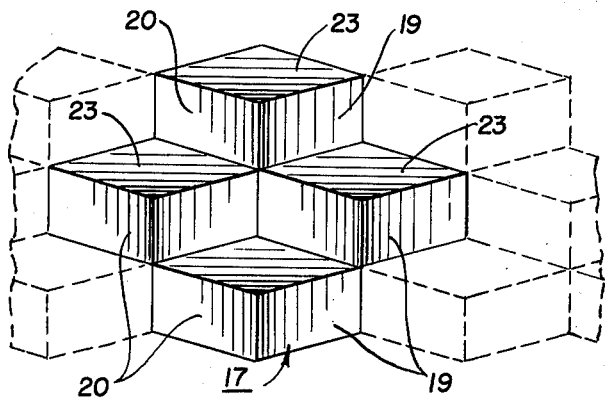

In practice, a number of pins are bound together in side-by-side fashion to form a bundle. Normally, the bundle comprises several rows of pins, one row being superimposed over the other as illustrated by FIGS. 16 to 18. The pin of FIGS. 4 to 6 was arbitrarily selected to form the bundle of FIGS. 16 to 18 as illustrated by the same reference numerals, but it will be understood that pins of the other figures and, indeed, pins of still other geometry but embodying a rectangular parallelepiped as described, can be used as well. Similarly, it will be understood that for convenience only a few rows and a few pins in each row are illustrated and that a bundle may contain many more rows and many more pins in each row.

Preferable, the pins and rows of pins are longitudinally positioned with respect to each other to expose only the facets of the forming ends as illustrated by FIGS. 16 and 17. This arrangement is preferred because every exposed surface at the forming end forms a surface in a reflector that is reflecting and no others. There are no shadows or blank areas which are nonreflecting and which can materially reduce the retroreflection and intensity of a reflector. In some cases, notably in using cube corner pins which are angled appreciably from the normal in a reciprocating male and female molding operation, it is most difficult if not impossible to avoid forming a reflector having some non-reflecting areas. But the present pin eliminates this disadvantage no matter how much from the normal the pins are disposed, merely by rearranging the geometry of the forming end of the pin carrying the rectangular parallelepiped with respect to the balance of the pin, as illustrated by the figures.

However, a bundle of the present pins can be otherwise positioned if desired. In the bundle of FIG. 18, the shank portion 16 of a pin of an upper row (as there viewed) has been displaced backwardly with respect to the pins of a lower row to expose lateral surfaces 50 of two hexagonal sides of two adjacent pins of a lower, more forward row.

There are in general two techniques by which one or more bundle of pins are used to form a reflector. These include either molding directly about the forming ends of bundles of pins, or by forming with the bundles an intermediate electroform from which a reflector is molded. Both techniques are known in the art.

In each molding process, the pins are suitable bound to one another at their common ends remote from the forming ends. This can be accomplished by clamping or by welding or brazing the ends together. In a direct molding operation, a bundle of pins is mounted on a reciprocating plunger which moves in and out of a mold having a general outline of the reflector to be fabricated. When the plunger is moved into the mold leaving a cavity, the mold receives moldable material to fill the cavity, usually thermoplastic material such as a transparent synthetic thermoplastic material like polymethyl methacrylacte. Upon setting, the material has the general outline of the mold and a plurality of light-reflecting areas left by the forming ends of the pins. Examples of this type of molding are described in U.S. Pat. Nos. 1,591,572 to Stimson, 1,906,655 to Stimson, and 3,443,281 to Walby.

In the electroform process, a pin bundle acts as a master pattern for an electroplating process. Since the pins are electrically conductive, they can be connected as the cathode and placed in a solution within a plating tank. Direct current passes through the anode, which may consist, for example, of a nickel alloy, such that the anode metal dissolves in the solution of the plating tank and deposits on the cathodic pin bundle. The electroplate is against the forming ends of the pins of the bundle, such that a reverse of their forming surfaces is produced. Following the electrodeposit, the resulting electroplated insert is unitary and possesses an imprint pattern left by the pin bundle. Instead of electrodepositing metal, metal vapor deposition can be used. After being stripped from the pin bundle, the electro formed insert is used to mold a reflector in lieu of the original pin bundle by shaping a mass of moldable material onto the formed surface of the insert, such as by injection molding. Examples of this type of molding operation are described in U.S. Pat. Nos. 3,632,695 to Howell and 3,811,647 to Pink. The patents herein mentioned are hereby incorporated by reference.

Although the pins have been illustrated and described as one integral body, a pin can be fabricated from several segments which when fitted together form the pin.

Figure 19:
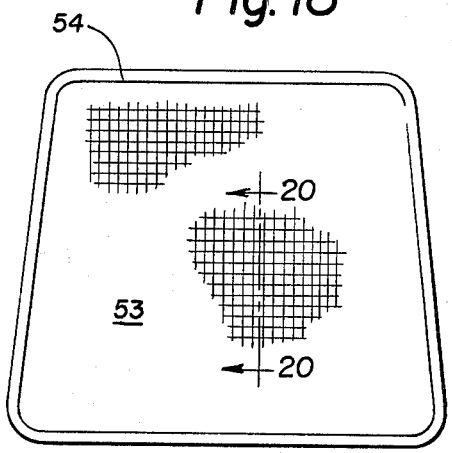
FIG. 19 is a front elevational view of a reflector molded with a bundle of the present pins.
Figure 20:
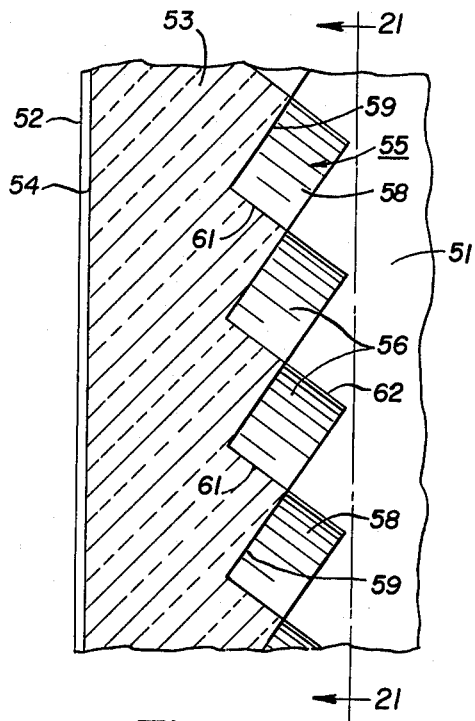
FIG. 20 is a greatly enlarged, fragmentary section of FIG. 19 on the line 20—20.
Figure 21:
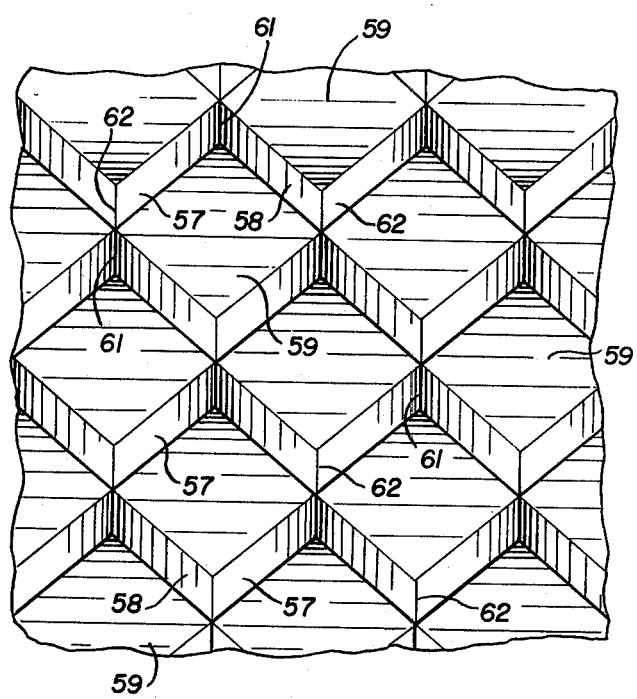
FIG. 21 is a view of FIG. 20 on the plane of the line 21—21.

In order to assist in describing the shape and function of a present pin, the structure of a reflector which, as one example only, may be formed with the pin is illustrated by FIGS. 19 to 22. FIG. 19 represents a front elevational view of a reflector having a plastic casing 51 with turned sides 52 to receive and hold a reflective sheet 53 formed with a bundle of pins. Sheet 53 has a substantially smooth front face 54 which defines a light-refracting surface. A back of sheet 53 has a plurality of light-reflecting areas or units generally represented at 55, which are formed from the pins of a bundle. Preferably, the outer corners of units 55 are coplanar. Here and elsewhere in the drawing, it will be appreciated that the light-reflecting units are shown greatly oversized to facilitate their illustration and description. Sheet 53 can be used alone in sheet form as illustrated by FIGS. 20 and 21, or as part as any support, such as a road sign, roadmarker, or the like, from which retroreflection of light is desired.

The light-reflecting units 55 cover an appreciable area of the back of sheet 53 and preferably are coextensive with that face. The array of light-reflecting units 55 are stacked to form a series of steps or rows 56 of the units which extend transversely across the back of sheet 53.

Light-reflecting units 55 comprise three mutually perpendicular facets 57, 58, and 59 which define a trihedral angle of a rectangular parallelepiped as described. Facets 57 and 58 intersect each other in a direction toward front face 54 to form an intersecting line 61 and define the two rectangular facets of the rectangular parallelepiped previously described. A light-reflecting unit 55 is preferably so positioned with respect to front face 54 of the sheet that a body diagonal of the rectangular parallelepiped is preferably but not necessarily substantially parallel to incident light refracted by face 54. A body diagonal, connecting the two opposite corners of the rectangular parallelepiped of a unit 55, is shown at 64 in FIG. 22. Where units within a row 56 have no spacing therebetween, facets 57 and 58 of the embodiment of FIGS. 20 and 21 intersect facets of adjoining light-reflecting units 55 in a direction away from front face 54 to form a second intersecting line 62. This line is not only substantially parallel to the first mentioned intersecting line 61 but, in the embodiment of FIGS. 20 and 21, is substantially aligned with intersecting line 61 of an adjacent row 56.

Figure 22:
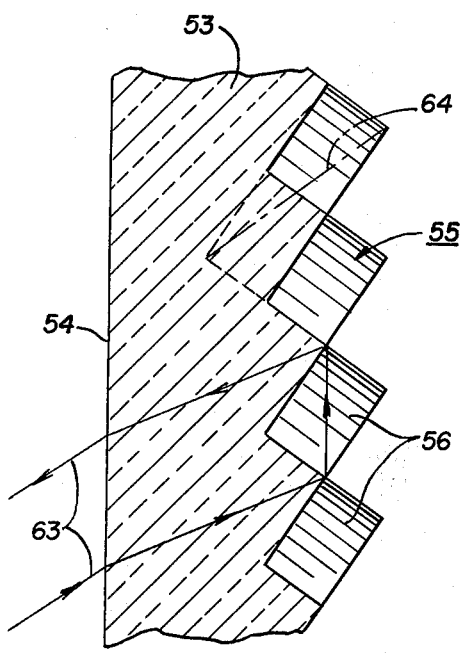
FIG. 22 is a view similar to FIG. 20 and shows the retroreflective route a beam of light may take with that embodiment.

FIG. 22 illustrates the retroreflective route an isolated beam of light represented at 63 may take in the embodiment of FIG. 20. The beam is first refracted by front face 54 and directed toward light-reflecting units 55. Upon striking any one of the three contiguous faces 57, 58 or 59 (shown as first striking a facet 59 to FIG. 22) beam 63 is reflected and returned substantially parallel to its incident direction.

Although the foregoing describes several embodiments of the present invention, it is understood that the invention may be practiced in still other forms within the scope of the following claims.

I claim:

1. A pin adapted to form a light-reflecting area in a reflector comprising a shank portion terminating in a tri-faceted forming end having the configuration of three adjacent facets of a rectangular parallelepiped, said three facets being mutually perpendicular to each other, and at least two of said facets being rectangular with two adjacent sides of each rectangle being unequal.

2. The pin of claim 1 in which said shank portion has a rectangular cross-section, two of the three facets of said tri-faceted forming end converge to form an intersecting line and define said two rectangular facets, and the third facet extends from said two rectangular facets rearwardly of the pin in a direction along a side of said forming end.

3. The pin of claim 2 in which the longitudinal central axis of the pin is substantially perpendicular to said intersecting line.

4. The pin of claim 1 in which the longitudinal central axis of the pin is substantially parallel to the body diagonal of the rectangular parallelepiped.

5. The pin of claim 1 in which said shank portion has a hexagonal cross-section, two of the three facets of said tri-faceted forming end converge to form an intersecting line subtending an acute angle with the longitudinal central axis of the pin and to define said two rectangular facets, and the third facet extends from said two rectangular faces rearwardly of the pin in a direction to intersect two of the six sides of the hexagonal cross-section.

6. The pin of claim 1 in which the longitudinal central axis of the pin is substantially perpendicular to the plane of a face of a reflector formed with such pin.

7. The pin of claim 1 in which the three facets form three intersecting lines having a common point, and the longitudinal central axis of the pin is substantially parallel to a line subtending equal angles with said three intersecting lines.

8. The pin of claim 1 in which said shank portion has a rectangular cross-section and an end facet disposed at right angles to the central longitudinal axis of the pin, the remaining two facets extend from said end facet rearwardly of the pin in directions along two adjacent sides of said forming end and define said two rectangular facets.

9. The pin of claim 1 in which said shank portion has a rectangular cross-section, one facet is disposed at a right angle to the central longitudinal axis of the pin, and the remaining two facets extend from said one facet rearwardly of the pin and converge toward one another to form an intersecting line substantially parallel to said central longitudinal axis, said remaining two facets defining said two rectangular facets.

10. The pin of claim 5 in which the longitudinal central axis of the pin is substantially parallel to the body diagonal of the rectangular parallelepiped.

11. The pin of claim 5 in which the longitudinal central axis of the pin is substantially perpendicular to the plane of a face of a reflector formed with such pin.

12. The pin of claim 5 in which the three facets form three intersecting lines having a common point, and the longitudinal central axis of the pin is substantially parallel to a line subtending equal angles with said three intersecting lines.

13. The pin of claim 1 in which said two rectangular facets are equal in size, and the third facet is a square.

14. The pin of claim 1 in combination with other like pins to form a bundle.

15. The pin of claim 1 in combination with other like pins to form a bundle, said bundle comprising at least two rows of said pins, one row being superimposed over the other, and the pins of said two rows being longitudinally positioned with respect to each other to expose only said forming ends of said pins.

16. The pin of claim 1 in combination with other like pins to form a bundle, said bundle comprising at least two rows of said pins, one row being superimposed over the other, the pins of each row being aligned to place their forming ends adjacent one another, one row being displaced with respect to the other in a direction longitudinally of the pins to expose a lateral surface of at least one pin of the other row.

* * * * *